United States Patent
Al-Ali

(10) Patent No.: US 9,623,973 B2
(45) Date of Patent: Apr. 18, 2017

(54) COOLING CONCEPT FOR FUEL CELL EMERGENCY POWER SUPPLY

(75) Inventor: Baker Al-Ali, Darmstadt (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 570 days.

(21) Appl. No.: 13/344,213

(22) Filed: Jan. 5, 2012

(65) Prior Publication Data
US 2012/0118528 A1   May 17, 2012

Related U.S. Application Data

(63) Continuation of application No. PCT/EP2010/058677, filed on Jun. 18, 2010.
(Continued)

(30) Foreign Application Priority Data

Jul. 6, 2009 (DE) .................. 10 2009 031 880

(51) Int. Cl.
*B60H 1/00* (2006.01)
*B64D 13/08* (2006.01)
(Continued)

(52) U.S. Cl.
CPC ...... *B64D 13/08* (2013.01); *B64D 2013/0688* (2013.01); *B64D 2041/005* (2013.01);
(Continued)

(58) Field of Classification Search
CPC ........ B64D 13/00; B64D 13/04; B64D 13/06; B64D 13/08; Y02T 50/53; Y02T 50/56; B60H 1/00278
(Continued)

(56) References Cited

U.S. PATENT DOCUMENTS 2,119,402 A * 5/1938 Puffer ............................. 244/59
4,646,993 A * 3/1987 Baetke ..................... 244/117 R
(Continued)

FOREIGN PATENT DOCUMENTS

DE     3812739 C1    7/1989
DE    10244189 A1    6/2003
(Continued)

OTHER PUBLICATIONS

German Patent Office, German Office Action dated Dec. 4, 2012 for German Patent Application No. 102009031880.1.
(Continued)

*Primary Examiner* — Travis Ruby
(74) *Attorney, Agent, or Firm* — Lorenz & Kopf, LLC

(57) ABSTRACT

A system is provided for cooling a heat-dissipating device in a vehicle with a fuselage, a passenger cabin, and a region pneumatically communicating with the previously mentioned, which region is situated outside the passenger cabin. At least one heat exchanger is provided for transferring heat of the heat-dissipating device to air, and at least one air conveying device for conveying air through the heat exchanger. The air conveying device is designed to convey air from the passenger cabin to the heat exchanger. The heat exchanger is designed to subject the inflowing air to heat of the heat-dissipating device and to dissipate it to the region situated outside the passenger cabin, thus inducing mixing of the air that has been subjected to heat with the air present in the outside region, and inducing a return flow from the outside region to the passenger cabin by way of their pneumatic connection.

17 Claims, 4 Drawing Sheets

Related U.S. Application Data

(60) Provisional application No. 61/223,153, filed on Jul. 6, 2009.

(51) Int. Cl.
*B64D 13/06* (2006.01)
*B64D 41/00* (2006.01)

(52) U.S. Cl.
CPC .............. *Y02T 50/44* (2013.01); *Y02T 50/56* (2013.01); *Y02T 90/36* (2013.01)

(58) Field of Classification Search
USPC ..... 165/41, 53, 54, 59, 104.21, 104.33, 234, 165/235, 278; 62/239, 243, 244; 244/119; 454/71–74
See application file for complete search history.

(56) References Cited

U.S. PATENT DOCUMENTS

| | | | |
|---|---|---|---|
| RE32,554 E * | 12/1987 | Murphy | 244/118.5 |
| 4,819,720 A | 4/1989 | Howard | |
| 4,969,509 A | 11/1990 | Merensky | |
| 5,516,330 A | 5/1996 | Dechow et al. | |
| 5,701,755 A | 12/1997 | Severson et al. | |
| 5,873,256 A | 2/1999 | Denniston | |
| 6,585,189 B1 * | 7/2003 | Smallhorn | 244/118.5 |
| 7,029,065 B2 | 4/2006 | Laib | |
| 7,108,227 B2 * | 9/2006 | Kunzel et al. | 244/119 |
| 7,740,201 B2 | 6/2010 | Eichholz et al. | |
| 2006/0219842 A1 * | 10/2006 | Shell et al. | 244/118.5 |
| 2009/0211273 A1 | 8/2009 | Klewer | |
| 2010/0024438 A1 | 2/2010 | Hoffjann et al. | |
| 2010/0240290 A1 | 9/2010 | Markwart et al. | |

FOREIGN PATENT DOCUMENTS

| | | |
|---|---|---|
| DE | 10361655 A1 | 8/2005 |
| DE | 102006046114 A1 | 4/2008 |
| DE | 102007049926 A1 | 4/2009 |
| GB | 2382872 A | 6/2003 |
| WO | 2004074095 A1 | 9/2004 |
| WO | 2008014912 A1 | 2/2008 |

OTHER PUBLICATIONS

International Search Report dated Apr. 26, 2011 for International Application No. PCT/EP2010/058677.
German Office Action dated Dec. 15, 2009 for German Application No. 102009031880.1.
State Intellectual Property Office of the People's Republic of China, Office Action in Chinese Patent Application No. 201080030100.9 mailed Aug. 13, 2014.

* cited by examiner ic # COOLING CONCEPT FOR FUEL CELL EMERGENCY POWER SUPPLY

CROSS-REFERENCE TO RELATED APPLICATIONS

This application is a continuation of International Application No. PCT/EP2010/058677, filed Jun. 18, 2010, which was published under PCT Article 21(2), which claims priority to German Patent Application No. 102009031880.1 filed Jul. 6, 2009 and of U.S. Provisional Patent Application No. 61/223,153 filed Jul. 6, 2009 the disclosure of which applications is hereby incorporated herein by reference.

TECHNICAL FIELD

The technical field relates to a system and a method for cooling a device in a vehicle, to the use of such a system in an aircraft, and to an aircraft comprising at least one such system.

BACKGROUND

In modern vehicles of all types devices for a host of different purposes are frequently integrated, which devices produce heat and accordingly need to be cooled. By blowing air through a radiator out into the surroundings of the vehicle, this task is usually accomplished quite conveniently and easily. In special applications, for example, relating to devices to be cooled in an aircraft, such an exchange with ambient air is not always possible. Cases are imaginable in which an aircraft flies through a region with whirled up or floating volcanic ash, which would with high probability result in failure of the engines, and consequently the usual systems, which depend on engines, for providing cabin pressure would cease to function.

The common measure to confront this case, which is also referred to as TEFO ("Total Engine Flame Out"), in the case of flying at cruising altitude consists of closing off the cabin of the aircraft vis-à-vis the surroundings to prevent any reduction in the cabin pressure. In this process, the air outflow valves that are used for regulating the pressure are completely closed. Interrupting the regulated airflow from the cabin to the outside would thus consequently be responsible for communication with the ambient air for performing cooling tasks no longer being possible.

To remain with the example of the aircraft, for cooling purposes it would also be possible to arrange a heat exchanger on the outside of the aircraft and to have ambient airflow through said heat exchanger. However, when the aircraft flies through a region comprising volcanic ash, the radiator could become completely blocked and thus essentially inoperable.

As an alternative to cooling by means of outside air, heat-producing devices could be cooled by means of the existing air within the cabin of the vehicle, which, however, in the case of devices that are relatively strongly heat-generating leads to a significant increase in the temperature in the passenger cabin. Because of a lack of air exchange in the cabin of an aircraft in case of failure of the engines, also due to the pronounced insulation vis-à-vis the outer skin of the aircraft, gradually the temperature within the cabin would become uncomfortable or unbearable.

For example, fuel cells may be considered devices that are strongly heat-generating, which fuel cells in the exemplary case of engine failure of an aircraft could be used to supply electricity to essential systems within the aircraft so that an emergency landing can be ensured. This case means that only if there is a total loss of a cooling device that communicates with the ambient air will a device that is strongly heat-generating be started up.

In view of the foregoing, at least one object to provide a system for cooling a device in a vehicle, which system is not associated with the disadvantages described above. In particular, the system provides adequate cooling that is not associated with a significant increase in the temperature within the passenger cabin and at the same time does not require any air exchange with the surroundings. In addition, other objects, desirable features, and characteristics will become apparent from the subsequent summary and detailed description, and the appended claims, taken in conjunction with the accompanying drawings and this background.

SUMMARY

A heat exchanger is provided for cooling a device in a vehicle to be arranged in such a manner that by way of an air conveying device air from a passenger cabin of the vehicle can flow through the heat exchanger, which air reaches the heat exchanger by way of an air inlet, and can flow out by way of an air outlet into a region of the vehicle, which region is arranged outside the passenger cabin. In the case of aircraft, this region could, for example, be a so-called "underfloor region". The air heated by means of the heat exchanger is distributed in this region and dissipates its heat evenly to the air masses present in this region, which air masses in turn dissipate heat to the surroundings of the vehicle by means of the outer skin of the vehicle.

Frequently in vehicles, the passenger cabin comprises better thermal insulation than is the case in regions situated outside the passenger cabin. Consequently, the heat in a region situated outside the passenger cabin of the vehicle could be dissipated to the surroundings more easily than is the case from the passenger cabin. In this context, it should generally be noted that the region situated outside the passenger cabin is nevertheless situated within the vehicle body or fuselage.

Because air is removed from the passenger cabin and is channeled to a region situated outside the passenger cabin, a pressure differential results that leads to air flowing into the passenger cabin. To remain with the example of an aircraft, consequently an air flow from an underfloor region by way of flow-through openings in dado panels to the passenger cabin situated above it could result. Since the heated air in the underfloor region has mixed with the air present in that region and since always some degree of heat dissipation to the surroundings takes place, the air flowing into the passenger cabin is already pre-cooled. The remaining heat is dissipated to the air in the passenger cabin by way of mixing. It should be pointed out that from the passenger cabin, despite its better heat insulation, nevertheless a degree of heat transfer to the surroundings of the vehicle can be observed if there is a temperature gradient to the surroundings. It is thus to be expected that despite the heat input of devices to be cooled, the resulting increase in the air temperature within the passenger cabin is relatively small. For channeling air from the cabin through the heat exchanger, an air conveying device is used that actively conveys air from the passenger cabin through the heat exchanger. This could, for example, be a blower or a ventilator.

In an embodiment of the system, the heat exchanger is located in a region underneath the cabin floor so that the distance, which the conveyed air has to cover, is as short as possible. As an alternative, it would also be possible to arrange the heat exchanger directly within the cabin floor so that an air conveying device that is arranged directly on the heat exchanger on a side facing away from the passenger cabin causes air to flow directly through the heat exchanger. To this effect a corresponding air-permeable cover at the top of the heat exchanger in the region of the top of the cabin floor could be arranged, which cover is, for example, designed as a perforated plate or the like. Integration of the heat exchanger within the cabin floor should therefore take place in a region where there is as little traffic as possible.

In a further embodiment, the air conveying device can be designed as a conventional recirculation blower, which in the application of the system in a passenger aircraft, is present in that location anyway. Consequently, arranging the heat exchanger in close proximity to the recirculation blower is advantageous, which results in savings of weight and in general simplification of the system.

A method is also provided for cooling a device in a vehicle. This method comprises conveying air from a passenger cabin of the aircraft through a heat exchanger to a region arranged outside the passenger cabin, and thus to force a flow of partly-heated air from a region arranged outside the passenger cabin back into the passenger cabin.

Furthermore, a system is provided in an aircraft, as well as by an emergency power supply system in an aircraft.

Finally, an aircraft is provided that comprises at least one air-breathing engine, at least one electrical energy-requiring electrical device, and at least one discharge valve. The discharge valve is being closed in the case of failure of the engine, and a fuel cell is used for generating electrical energy. The fuel cell comprises a heat exchanger through which by means of an air conveying device air from the passenger cabin flows, which air in an underfloor region mixes with already present air, at least in part dissipates its heat by way of the outer skin of the aircraft, and flows into the passenger cabin to bring about pressure balance.

BRIEF DESCRIPTION OF THE DRAWINGS

The embodiments will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
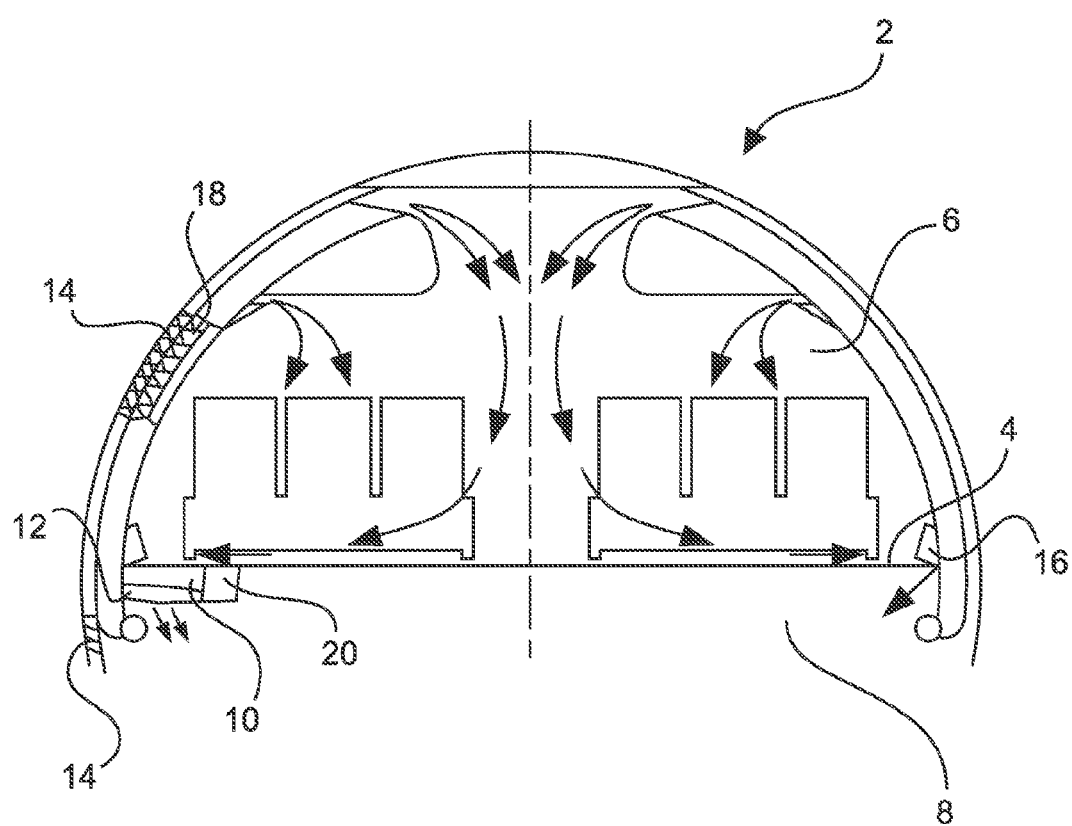
FIG. 1 shows a diagrammatic view of an embodiment of the system.
Figure 2:
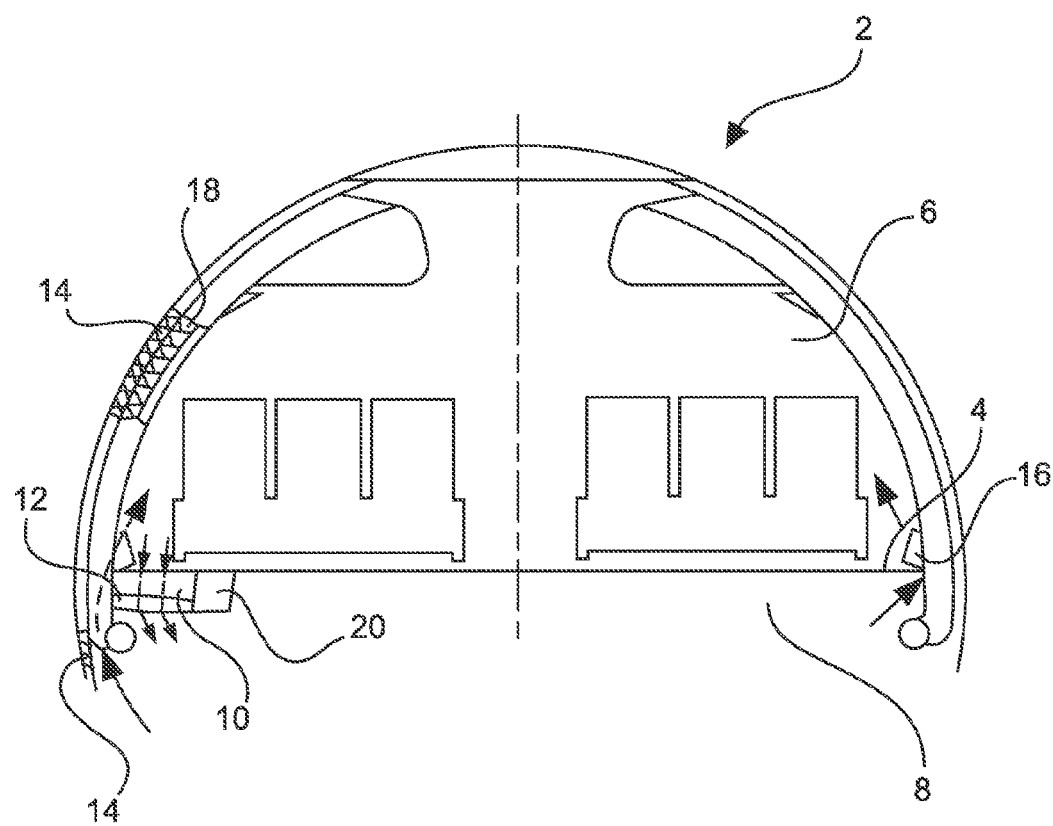
FIG. 2 shows a diagrammatic view of a further embodiment of the system.

FIG. 1 and FIG. 2 show part of a vehicle body or fuselage 2 in which a floor 4 is arranged that separates a passenger cabin 6 from an underfloor region 8. In the region of the cabin floor 4 a heat exchanger 10 is arranged on whose underside, which faces the underfloor region 8, an air conveying device 12 for conveying air from the cabin 6 through the heat exchanger 10 into the underfloor region 8 is arranged.

At least in an aircraft the underfloor region 8 extends along a significant part of the length of the fuselage 2 and towards the outside is predominantly insulated by means of primary insulation 14. This means that air flowing from the heat exchanger 10 is mixed with the air already present in the underfloor region 8, as a result of which the air present in the underfloor region 8 is slightly heated. However, in the case of a temperature differential between the surroundings and the underfloor region 8, part of this heat is dissipated to the environment of the vehicle body or fuselage 2 by way of the primary insulation 14.

FIG. 1 shows a configuration in which recirculation is carried out by way of recirculation blowers or the like, in which configuration the air flowing into the passenger cabin 6 is introduced by way of the conventional air outlets. In contrast, FIG. 2 shows an exemplary embodiment in which recirculation is essentially deactivated and as a result of the outflow of air from the passenger cabin 6 within the passenger cabin 6 a slight negative pressure arises, or in the underfloor region 8 a certain positive pressure arises, so that a flow of air from the underfloor region 8 to the passenger cabin 6 is induced. This could take place by means of a number of dado panels 16 arranged in the vehicle body or fuselage along its longitudinal axis, which dado panels 16 apart from their use for lining a floor-to-wall transition in a passenger cabin 6 are also used to prevent any suddenly occurring high pressure differential between the passenger cabin 6 and the underfloor region 8 in that the dado panels 16 abruptly increase an always present flow cross section. During regular operation of the air conditioning unit of an aircraft the pneumatic connection between the underfloor region 8 and the passenger cabin 6 ensures an airflow from the passenger cabin 6 to the underfloor region 8, whereas with the application of the system according to the embodiments this connection is used in reverse.

Because of heated exhaust air from the heat exchanger 10 mixing with the air present in the underfloor region 8, the air flowing into the passenger cabin 6 is significantly cooler than the exhaust air from the heat exchanger 10 per se. The incoming air mixes with the air already present in the passenger cabin 6, and consequently the previously mentioned heats up only slightly. Despite the thermal insulation comprising primary insulation 14 and usually secondary insulation 18, which thermal insulation is relatively substantial when compared to that of the underfloor region 8, if there is a temperature differential between the surroundings of the vehicle and the passenger cabin 6 some heat is also conducted towards the outside by way of the vehicle body or fuselage 2, thus contributing to continuous heat removal from the passenger cabin 6. Subsequently the air from the passenger cabin 6 is channeled, for cooling, through the heat exchanger 10.

According to this concept, locally arising heat can be removed efficiently to the surroundings by a device, by means of air present in the entire aircraft fuselage being used as a heat sink, without this necessitating a direct air exchange with the surroundings. As already described in the introduction, a fuel cell 20 can be considered as a particular example of a device to be cooled, which fuel cell 20 could be arranged at any desired location within the aircraft fuselage 2. As an example a fuel cell 20 is shown, which is situated in close proximity to the cabin floor 4 and consequently can comprise a direct connection to the heat exchanger 10.

To the person skilled in the art it is self-evident that the fuel cell 20 or some other heat-generating device can also be spaced apart from the heat exchanger 10 and by way of a suitable connection dissipates heat to the heat exchanger. It might, for example, make sense to arrange the fuel cell outside the pressurized or air conditioned region of the aircraft fuselage 2 and to connect it to the heat exchanger 10 by way of a liquid line or air line.

Figure 3:
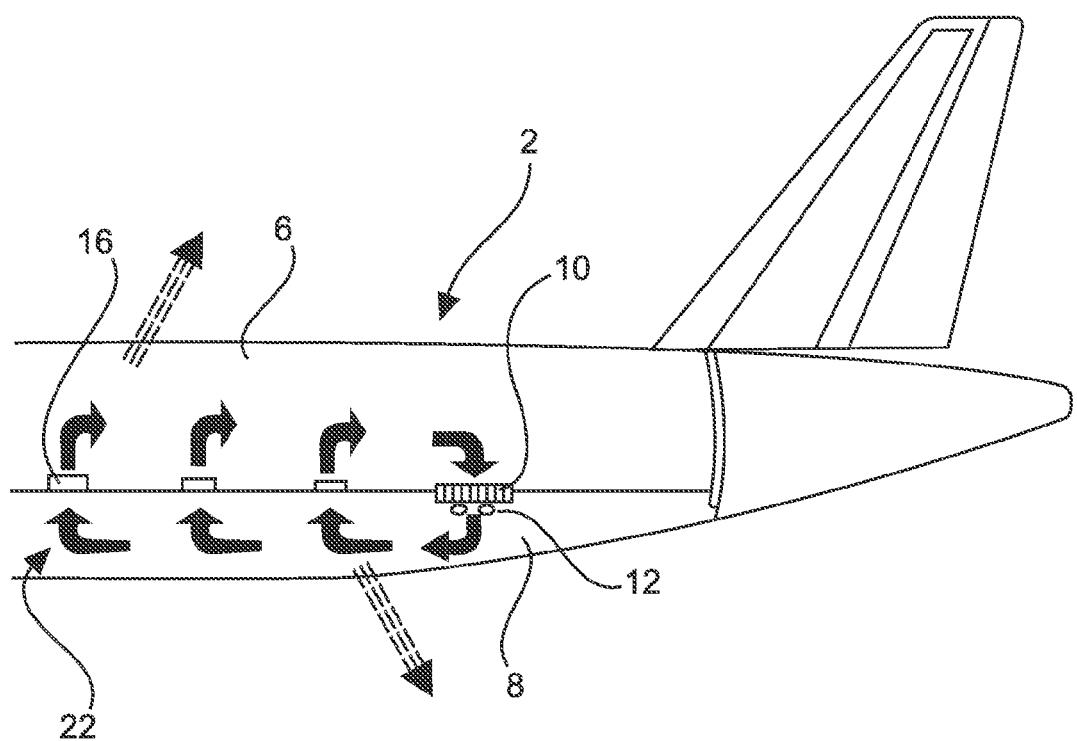
FIG. 3 shows a lateral section of a cabin of an aircraft with the application of the system and of the method according to an embodiment.

FIG. 3 further clarifies the principle of operation of the system. Mixing in an underfloor region 8 can take place in a relatively large volume in which there is also a relatively large wall surface 22 for heat transfer to the surroundings of the aircraft fuselage 2. The same applies to the passenger cabin 6. The largest possible volume of the vehicle fuselage 2 is used as a heat sink in order to dissipate the heat effectively and evenly to the surroundings. This could lead to a multitude of dado panels 16 being subjected to a reverse return flow of air from the underfloor region 8 to the passenger cabin 6.

Figure 4:
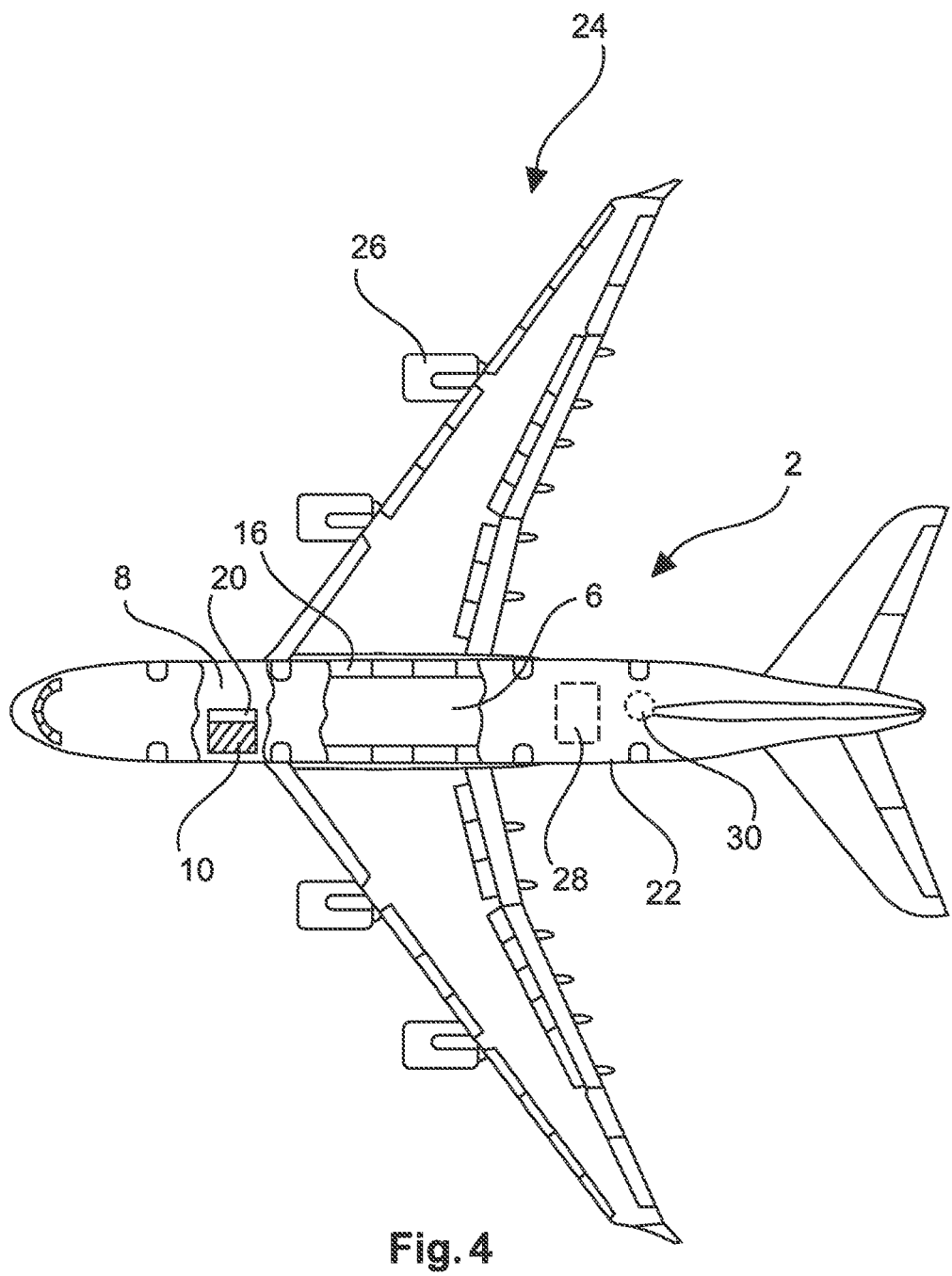
FIG. 4 shows an aircraft comprising at least one system.

Finally, FIG. 4 shows an aircraft 24 comprising several partial sections and invisible edges (shown in dashed lines), which aircraft 24 comprises several air-breathing engines 26, at least one electrical energy-requiring electrical device 28, and at least one discharge valve 30. The discharge valve 30 is being closed in the case of failure of the engines 26, and a fuel cell 20 is used for generating electrical energy. The fuel cell 20 comprises a heat exchanger 10 through which by means of an air conveying device 12 air from the passenger cabin 6 flows, which air in an underfloor region 8 mixes with already present air, at least in part dissipates its heat by way of the outer skin 22 of the aircraft, and flows into the passenger cabin 6 to bring about pressure balance.

It should be pointed out that the invention is not limited to its use in an aircraft. Instead, the embodiments can also be used in such vehicles where an air exchange with the surroundings of the vehicle is not possible.

In addition, it should be pointed out that "comprising" does not exclude other elements or steps, and "a" or "one" does not exclude a plural number. Furthermore, it should be pointed out that characteristics or steps, which have been described with reference to one of the above exemplary embodiments, can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft, comprising:
   several air breathing engines;
   at least one electrical energy-requiring electrical device;
   at least one discharge valve configured to regulate airflow from the at least one passenger cabin to an environment external to the aircraft;
   at least one passenger cabin having a floor;
   a fuselage region situated outside the at least one passenger cabin and including a pneumatic connection connecting the fuselage region with the at least one passenger cabin;
   at least one heat-dissipating device in the form of a fuel cell disposed beneath the floor of the at least one passenger cabin in the fuselage region;
   at least one heat exchanger that subjects air to heat of the at least one heat-dissipating device and dissipates heat to the fuselage region, and
   at least one air conveying device configured to convey air from the at least one passenger cabin through the at least one heat exchanger,
   wherein mixing of the air subjected to heat from the at least one heat exchanger with air present in the fuselage region is induced in the fuselage region,
   wherein the pneumatic connection is at least one dado panel lining a cabin floor-to-wall transition
   wherein the discharge valve is configured to close in the event of engine failure of the several air breathing engines and to cause the mixed air to flow from the fuselage region to the at least one passenger cabin; and
   wherein the fuel cell is used for generating electrical energy.

2. The vehicle of claim 1, wherein the at least one passenger cabin and the fuselage region are separated by a cabin floor.

3. The vehicle of claim 2, wherein the at least one heat exchanger is arranged on the cabin floor.

4. The vehicle of claim 1, wherein the at least one air conveying device is a recirculation blower.

5. The vehicle of claim 1, wherein the at least one heat-dissipating device is a fuel cell configured to provide electrical energy.

6. The vehicle of claim 1, wherein the vehicle is an aircraft.

7. The vehicle of claim 1, wherein the at least one heat exchanger is disposed beneath the floor of the at least one passenger cabin directly adjacent to the at least one heat-dissipating device.

8. A method for cooling a heat-dissipating device in a vehicle, the vehicle having several air-breathing engines, at least one electrical energy-requiring electrical device, and at least one discharge valve configured to regulate airflow from a passenger cabin of the vehicle to an environment external to the vehicle, the method comprising:
   dissipating heat from the heat-dissipating device to a heat exchanger disposed in a fuselage region of the vehicle separate from a passenger cabin of the vehicle;
   conveying air from the passenger cabin of the vehicle through the heat exchanger to the fuselage region situated outside the passenger cabin, the air conveyed through the heat exchanger mixing with the air in the fuselage region; and
   concurrently inducing a flow of the mixed air from the fuselage region back to the passenger cabin from a pressure differential between the passenger cabin and the fuselage region, the flow of the mixed air induced with at least one dado panel arranged in the vehicle body and connecting the fuselage region to the at least one passenger cabin,
   wherein the discharge valve is configured to close in the event of a failure of the several air-breathing engines and to cause the mixed air to flow from the fuselage region to the passenger cabin;
   wherein and the fuel cell is used for generating electrical energy.

9. The method of claim 8, wherein the passenger cabin and the fuselage region are separated by a cabin floor.

10. The method of claim 9, wherein the heat exchanger is arranged on the cabin floor.

11. The method of claim 8, wherein the heat-dissipating device is a fuel cell configured to provide electrical energy.

12. An aircraft, comprising:
several air breathing engines;
at least one electrical energy-requiring electrical device;
at least one discharge valve configured to regulate airflow from at least one passenger cabin to an environment external to the aircraft;
a fuselage;
at least one passenger cabin within the fuselage;
a fuselage region situated outside the at least one passenger cabin and including a pneumatic connection connecting the fuselage region to the at least one passenger cabin;
at least one heat-dissipating device in the form of a fuel cell disposed in the fuselage region;
at least one heat exchanger that subjects inflowing air to heat of the at least one heat-dissipating device and dissipates heat to the fuselage region, and
at least one air conveying device configured to convey air from the at least one passenger cabin through the at least one heat exchanger,
wherein mixing of the air subjected to heat from the at least one heat exchanger with air present in the fuselage region is induced in the fuselage region,
wherein the pneumatic connection is at least one dado panel lining a cabin floor-to-wall transition
wherein the discharge valve is configured to close in the event of failure of the several air-breathing engines and to cause the mixed air to flow from the fuselage region to the at least one passenger cabin; and
wherein the fuel cell is used for generating electrical energy.

13. The aircraft of claim 12, wherein the at least one passenger cabin and the fuselage region are separated by a cabin floor.

14. The aircraft of claim 13, wherein the at least one heat exchanger is arranged on the cabin floor.

15. The aircraft of claim 12, wherein the at least one air conveying device is a recirculation blower.

16. The aircraft of claim 12, wherein the at least one heat-dissipating device is a fuel cell configured to provide electrical energy.

17. The aircraft of claim 12, wherein the at least one heat exchanger is disposed in the fuselage region directly adjacent to the at least one heat-dissipating device.

* * * * *